United States Patent [19]

Boyle

[11] 3,981,593

[45] Sept. 21, 1976

[54] SOFT CONTACT LENS INSPECTION DEVICE

[76] Inventor: Robert M. Boyle, 2655 Tokola St., Concord, Calif. 94518

[22] Filed: Feb. 27, 1975

[21] Appl. No.: 553,476

[52] U.S. Cl. .................................. 356/239; 350/10; 350/239
[51] Int. Cl.² ........................................ G01N 21/04
[58] Field of Search .......... 356/124, 125, 171, 237, 356/239, 246; 350/10, 239

[56] References Cited
UNITED STATES PATENTS 3,029,694    4/1962    Dantzic .............................. 350/239

Primary Examiner—John K. Corbin
Assistant Examiner—Matthew W. Koren
Attorney, Agent, or Firm—Robert Charles Hill

[57] ABSTRACT

A soft contact lens inspection device is provided with a housing, a magnifying lens mounted within the housing and a contact lens supporting member at the top of the housing. A reticle may also be provided.

12 Claims, 4 Drawing Figures

U.S. Patent  Sept. 21, 1976  3,981,593
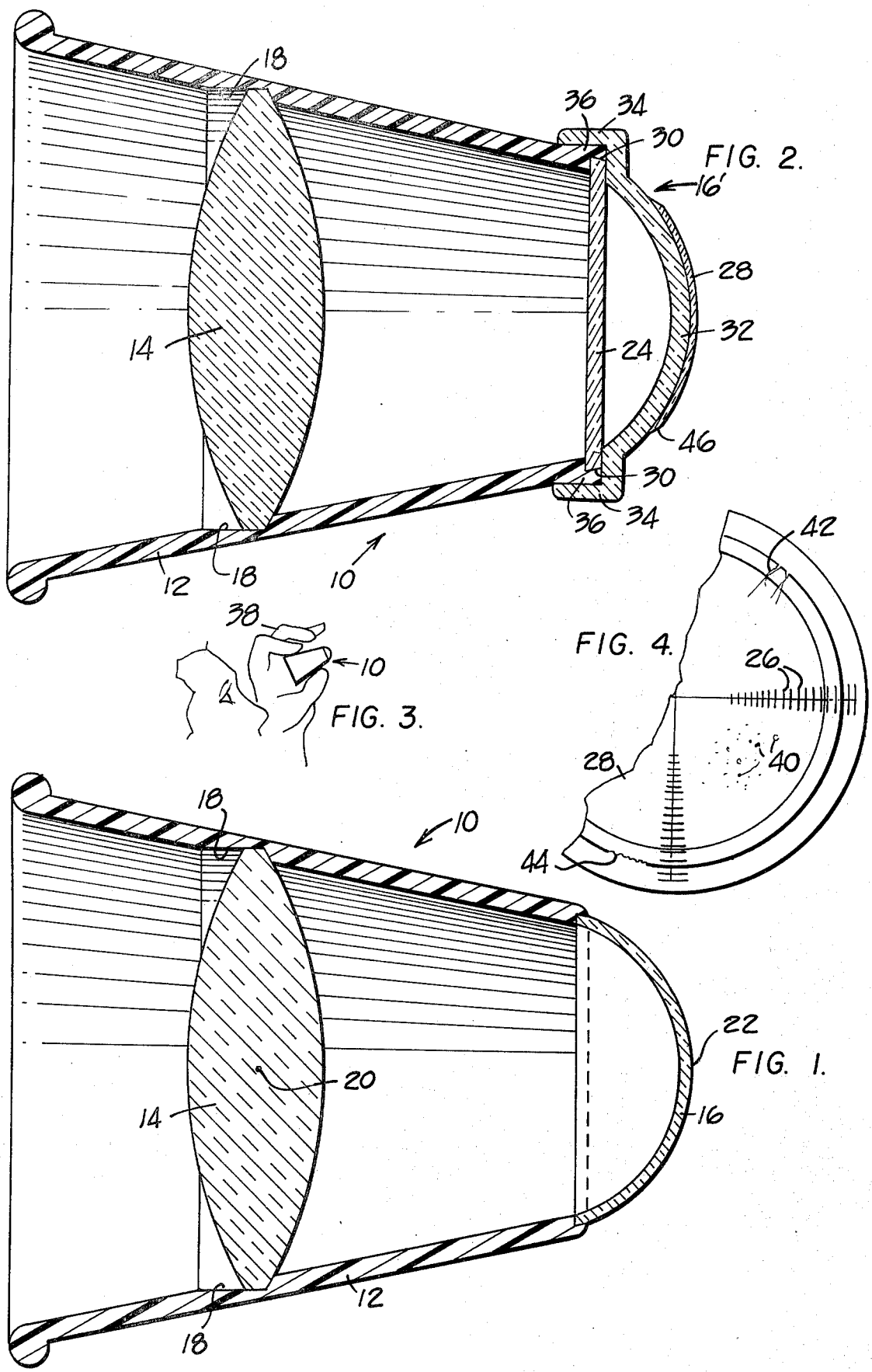

SOFT CONTACT LENS INSPECTION DEVICE

BACKGROUND OF THE INVENTION

A soft contact lens inspection device is provided with a magnifying lens to reveal cracks, foreign matter, and optical imperfections on the contact lens and a supporting member to properly position the contact lens for inspection. The soft contact lens inspection device may also be provided with a reticle for measuring the width of bevel and diameter of the contact lens.

SUMMARY OF THE INVENTION

The advent of soft contact lenses is a major progressive change in the field of vision care. Soft contact lenses are made from a plastic material which absorbs water and becomes soft and supple. These lenses are usually comfortable from the beginning and allow for a correct fit to the eye during the first visit to the doctor or optometrist. Thousands of satisfied wearers receive good to excellent visual acuity through the use of soft contact lenses.

Of course, soft contact lenses must be properly handled and cared for to have a long and useful life for the wearer. These lenses are far from being indestructible. If the lenses are allowed to dry out, they become hard and brittle and can easily develop accidental cracks and tears. If the lenses are not handled with reasonable care, even in the wet state, the edges can become damaged. If the lenses are not asepticized by exposure to steam on a nightly basis, disease-causing germs such as pathogens may form on the surface of the lens, thus aiding in eye infection or inflammation. If extreme cleanliness is not practiced by the wearer, lint, small dirt particles, cosmetics and other oily substances may be on the lenses when they are placed on the eyes.

Various complicated and intricate designs of devices for inspecting contact lenses prior to usage have been used in the past to detect the matters discussed above. However, these structures have not proven entirely satisfactory to the public because they require an outside power source, are big and bulky, are time consuming in operation, and are expensive to purchase.

The invention in this application overcomes all of the above problems by providing a soft lens contact lens inspection device having a housing, a magnifying lens mounted within the housing, and a transparent contact lens supporting member at the top of the housing whereby when a contact lens is placed on the supporting member and the device is directed toward an independent source of light, the lens can be quickly inspected by looking through the housing.

It is the primary object of the present invention to provide a new and improved soft contact lens inspection device.

Another object is to provide a soft contact lens inspection device which is economical to produce and long lasting in usage.

A further object is to provide structure of the character described which is readily portable and easy to use.

BRIEF DESCRIPTION OF THE DRAWINGS

FIG. 1 is a side view in section of the soft contact lens inspection device of the present invention.

FIG. 2 is a side view in section of an inspection device having a separate reticle member therein.

FIG. 3 is a schematic view illustrating the soft contact lens inspection device in operation.

FIG. 4 is a view illustrating a portion of the contact lens under magnification and having imperfections therein.

DESCRIPTION OF THE PREFERRED EMBODIMENT

Referring to the drawing, there is shown the soft contact lens inspection device of this invention, generally indicated 10, which is intended for use in detecting imperfections and foreign matter on soft contact lenses. The inspection 10 is provided with a housing 12, a magnifying lens 14 mounted within the housing 12, and a transparent contact lens supporting member 16 at the top of the housing 12.

The housing 12 can be square or frusto-conical in shape and can be manufactured from plastic or rubber or the like or any other lightweight durable material suitable for filling safety and practical requirements. The magnifying lens 14 is positioned within the housing 12 by means of slots 18 which may be parallel to each other. The supporting member 16 can be a concave-convex plano lens having no magnifying properties or, if desired, the concave-convex lens may have a plus or minus dioptic power to accommodate the focal length of the magnifying lens 14. Both the magnifying lens 14 and the supporting member 16 can be made from transparent glass, rubber, plastic or the like. The supporting member 16, besides being clear, may also be colored, such as red, blue, yellow, etc., to improve the sensitivity of the inspection device 10. While the drawing shows that the diameter of the magnifying lens 14 is approximately equal the distance from the center 20 of the lens 14 to the top 22 of the supporting member 16, this is not always the case, as such determination is controlled by the configuration of the housing 12.

As seen in FIGS. 2 and 4, a comparative reticle 24 is intermediate the magnifying lens 14 and the supporting member 16. The reticle 24 is directly below or subjacent the supporting member 16 and has a system of lines 26 (FIG. 4) for measuring various parts of a soft contact lens 28. The lines 26 may be numbered and can be spaced to measure in any convenient system such as the English or metric system. Convergent slots 30 in the top of the housing 12 receive the reticle 24. The supporting member in FIG. 2, generally indicated 16', has a concave-convex lens portion 32 and a depending side portion 34 for snug engagement with exterior top parallel portion 36 of the housing 12. The length of the reticle 24 is greater than the diameter of the concave-convex lens portion 32 so that any and all portions of the contact lens 28 can be measured. Of course, if desired, the reticle could also be imprinted on the supporting member 16 or 16' with the same results.

In actual operation, a wet soft contact lens 28 is placed on the supporting member 16 or 16'. The lens 28 easily conforms to the shape of the supporting member and is held thereon by capillary action. The housing 12 is then gripped by the hand 38 of the observer (FIG. 3) and directed toward an independent light source such as an electric light or daylight. When the housing is placed near the eye, the observer looks through the magnifying lens 14 and observes (FIG. 4) such things as foreign matter 40, cracks 42, rough edges 44, and if a reticle 24 is present, the width of bevel 46 (FIG. 2) and the diameter of the lens 28. Thus, the soft contact lens can be quickly and thoroughly examined for imperfections etc., before each wearing thereby preventing aggravation and injury to the eye of a wearer.

I claim:

1. A soft contact lens inspection device, comprising:
a housing;
a magnifying lens mounted within said housing;
a transparent concave-convex contact lens supporting member at the top of said housing; said supporting member having the concave surface thereof facing said magnifying lens; and
a soft contact lens on the convex surface of said supporting member for inspection thereof.

2. The inspection device of claim 1 wherein the housing is frusto-conical in shape.

3. The inspection device of claim 1 wherein slots in the housing receive the magnifying lens.

4. The inspection device of claim 3 wherein the slots in the housing are parallel.

5. The inspection device of claim 1 wherein the supporting member is colored.

6. The inspection device of claim 1 wherein the supporting member has a reticle thereon.

7. A soft contact lens inspection device, comprising:
a housing;
a magnifying lens mounted within said housing;
a transparent concave-convex contact lens supporting member at the top of said housing; said supporting member having the concave surface thereof facing said magnifying lens;
a reticle intermediate said magnifying lens and said supporting member; and a soft contact lens on the convex surface of said supporting member for inspection thereof.

8. The inspection device of claim 7 wherein the reticle is subjacent the supporting member.

9. The inspection device of claim 7 wherein slots in the housing receive the reticle.

10. The inspection device of claim 7 wherein the slots in the housing are at the top of the housing and convergent.

11. The inspection device of claim 7 wherein the supporting member has a depending side portion for snug engagement with the top of the housing.

12. The inspection device of claim 7 wherein the length of the reticle is greater than the length of the concave-convex lens portion.

* * * * *